(12) United States Patent
Laird

(10) Patent No.: US 6,791,556 B1
(45) Date of Patent: Sep. 14, 2004

(54) MULTIFRAME RENDERING OF VIDEO DATA ON A GENERAL PURPOSE COMPUTER

(75) Inventor: Michael D. Laird, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/543,190

(22) Filed: Apr. 5, 2000

(51) Int. Cl.$^7$ .............................................. G06F 12/02
(52) U.S. Cl. ..................... 345/543; 345/540; 345/541; 345/545; 345/547; 711/147; 711/153; 711/170
(58) Field of Search .......................... 345/540–3, 726; 348/578; 711/147, 170, 171, 153

(56) References Cited

U.S. PATENT DOCUMENTS

| | | | | |
|---|---|---|---|---|
| 5,548,740 A | * | 8/1996 | Kiyohara | 345/502 |
| 5,737,605 A | * | 4/1998 | Cunningham et al. | 709/312 |
| 6,366,289 B1 | * | 4/2002 | Johns | 345/543 |
| 6,466,210 B1 | * | 10/2002 | Carlsen et al. | 345/629 |

* cited by examiner

Primary Examiner—Kee M. Tung
Assistant Examiner—Antonio Caschera
(74) Attorney, Agent, or Firm—Peter J. Gordon

(57) ABSTRACT

Processing video data with a combination of one or more operations, such as special effects, on a general-purpose computer may be improved by enabling one or more operations to access and process multiple samples of video data from other operations that introduce latencies for each request for data. Operations that introduce latencies include, for example, hardware for decompression and compression, network interfaces, and file systems. Because a computer program to implement the operations may be executed on several different general-purpose platforms, exact specifications of available hardware are not known in advance. For each operation, a computer program determines the available system memory and an amount of data that can be processed by each operation used in a composition or portion of a composition while sharing the available memory with other operations. Available system memory is allocated among the operations being used.

11 Claims, 9 Drawing Sheets

EFFECT 1 — 400
NUMBER OF BUFFERS: $X_1$ — 401
SIZE OF SAMPLE: $Y_1$ — 402
NUMBER OF SAMPLES: $Z_1$ — 403
MEMORY MANAGEMENT: POINTER — 405

EFFECT 2
NUMBER OF BUFFERS: $X_2$
SIZE OF SAMPLE: $Y_2$
NUMBER OF SAMPLES: $Z_2$
MEMORY MANAGEMENT: POINTER

EFFECT 3
NUMBER OF BUFFERS: $X_3$
SIZE OF SAMPLE: $Y_3$
NUMBER OF SAMPLES: $Z_3$
MEMORY MANAGEMENT: POINTER

EFFECT 4
NUMBER OF BUFFERS: $X_4$
SIZE OF SAMPLE: $Y_4$
NUMBER OF SAMPLES: $Z_4$
MEMORY MANAGEMENT: POINTER

EFFECT 5
NUMBER OF BUFFERS: $X_5$
SIZE OF SAMPLE: $Y_5$
NUMBER OF SAMPLES: $Z_5$
MEMORY MANAGEMENT: POINTER

EFFECT 6
NUMBER OF BUFFERS: $X_6$
SIZE OF SAMPLE: $Y_6$
NUMBER OF SAMPLES: $Z_6$
MEMORY MANAGEMENT: POINTER

EFFECT 7
NUMBER OF BUFFERS: $X_7$
SIZE OF SAMPLE: $Y_7$
NUMBER OF SAMPLES: $Z_7$
MEMORY MANAGEMENT: POINTER

EFFECT 8
NUMBER OF BUFFERS: $X_8$
SIZE OF SAMPLE: $Y_8$
NUMBER OF SAMPLES: $Z_8$
MEMORY MANAGEMENT: POINTER

MEMORY MANAGEMENT — 410
MAXIMUM BUFFERS: MB — 412
CURRENT TOTAL: TB — 414

MULTIFRAME RENDERING OF VIDEO DATA ON A GENERAL PURPOSE COMPUTER

BACKGROUND

In some video editing systems, special dedicated hardware processes streams of video data in a pipelined fashion to produce special effects. Such a system is disclosed, for example, in U.S. Pat. No. 5,654,737.

In other video editing systems, such as using Avid Cinema, or Adobe Premiere, special effects may be produced on a general-purpose computer using a computer program that instructs a general-purpose processor to perform the designated effects on video data in system memory. In such a system, the image data generally is processed within the system memory or other dedicated memory called an accumulation buffer. The process of rendering a special effect generally involves receiving compressed video data, decompressing it, and performing the effect to produce an uncompressed result. The uncompressed result often is compressed before it is stored.

In such systems, latencies involved in accessing, decompressing and processing an image to be used in an effect are compounded if each image is processed individually. Latencies may arise from decompression algorithms or hardware, or if image data either is retrieved from a remote file system, or if image data is the result of other processing.

SUMMARY

Processing video data with a combination of one or more operations, such as special effects, on a general-purpose computer may be improved by enabling one or more operations to access and process multiple samples of video data from other operations that introduce latencies for each request for data. Operations that introduce latencies include, for example, hardware for decompression and compression, network interfaces, and file systems. Because a computer program to implement the operations may be executed on several different general-purpose platforms, exact specifications of available hardware are not known in advance. For each operation, a computer program determines the available system memory and an amount of data that can be processed by each operation used in a composition or portion of a composition while sharing the available memory with other operations. Available system memory is allocated among the operations being used.

Accordingly, memory for processing video data may be allocated by determining available memory. For each operation in a combination of one or more operations, a maximum amount of data that can be processed by the operation while sharing the available memory with the one or more operations is determined. The available memory is allocated according to the determined maximum amount of data that can be processed by each operation while sharing the available memory with the one or more operations.

The maximum amount of data may be determined by determining a maximum number of buffers used by the one or more operations in any branch of a tree that represents the combination of the one or more operations using the available memory. The number of samples each operation can process using the available memory may then be determined to allocate the maximum number of buffers.

The number of samples may be determined by dividing the amount of available memory by the maximum number of buffers to determine a maximum buffer size. This maximum buffer size may be divided by a size of each sample to provide the number of samples. Further, a minimum from among maximum amounts of data that can be provided by any of the one or more operations may be determined and used to limit the determined number of samples.

Latency in processing video data using a combination of one or more operations on a general purpose computer may be reduced by determining memory available to the one or more operations. For each operation in the combination of one or more operations, a maximum amount of data that can be processed by the operation while sharing the available memory with the one or more operations may be determined. The available memory may be allocated according to the determined maximum amount of data that can be processed by each operation while sharing the available memory with the one or more operations. The video data may be processed using the combination of the one or more operations, wherein each operation requests data from other operations, and wherein the other operations respond to such requests with a number of samples of data corresponding to the memory allocated for the operation.

BRIEF DESCRIPTION OF THE DRAWINGS

FIG. 4 is a schematic illustration of data structures for multiple operations that share memory management data;

DETAILED DESCRIPTION

In the following description an example of memory allocation and managing responses to requests for data is provided in the contexts of special effects. Other operations and combinations of operations on video data also may be used. Such operations include any operation that modifies the image rate, image size or image contents of video data, including but not limited to color effects, color correction, paint operations, transitions, chroma keys, luma keys, compositing, pan and scan operations, etc.

Figure 1:
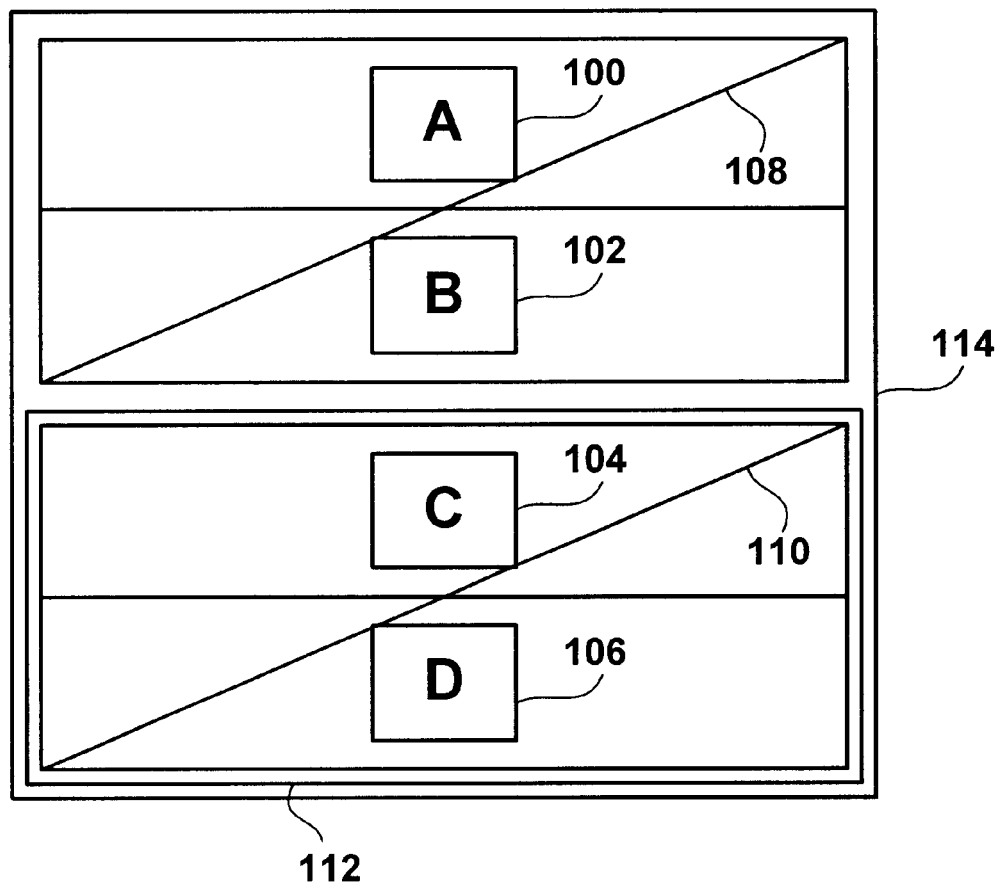
FIG. 1 is a schematic illustration of a portion of a composition containing effects.

FIG. 1 illustrates a portion of an example composition containing effects, from the perspective of a timeline. In particular, FIG. 1 illustrates four clips A, B, C and D, each of which is color corrected as indicated by the boxes 100, 102, 104 and 106. A transition occurs from scene A to scene B as indicated by a diagonal line 108. Similarly, a transition occurs from scene C to scene D as indicated by a diagonal line 110. The combined operation of C and D is processed by a color effect as indicated by box 112. The combination of scenes A and B and the combinations of scenes C and D are then composited by an effect as indicated by box 114.

The example composition as shown in FIG. 1 is not intended to reflect any particular kind of effect. It is merely used for illustrative purposes. Many other effects, combinations of effects, and other operations may be used. Either an entire composition or a portion of a composition may be processed in the manner described below, without any limitation on the present invention.

A composition usually is defined by a data structure representing the time relationship of multiple components of the composition. Such data structures are described by the Open Media Framework (OMF), Advanced Authoring Format (AAF), or structures described in U.S. Pat. Nos. 5,754,851 and 5,584,006 hereby incorporated by references. To playback such a composition, a playlist or playback graph commonly is generated. Such graphs are commonly used, for example, in Microsoft Active Movie device manager and Matrox's extensions to this device manager. A device manager also is described in PCT Publication No. WO98/45777, which corresponds to U.S. patent application Ser. No. 08/834,515, hereby incorporated by reference. Such graphs are generally multidimensional and represent the temporal relationships and dependency relationships among the variety of components in a composition. Each of these components also is associated with the resource used to produce the media data for the component, such as software or hardware to produce an effect.

Figure 2:
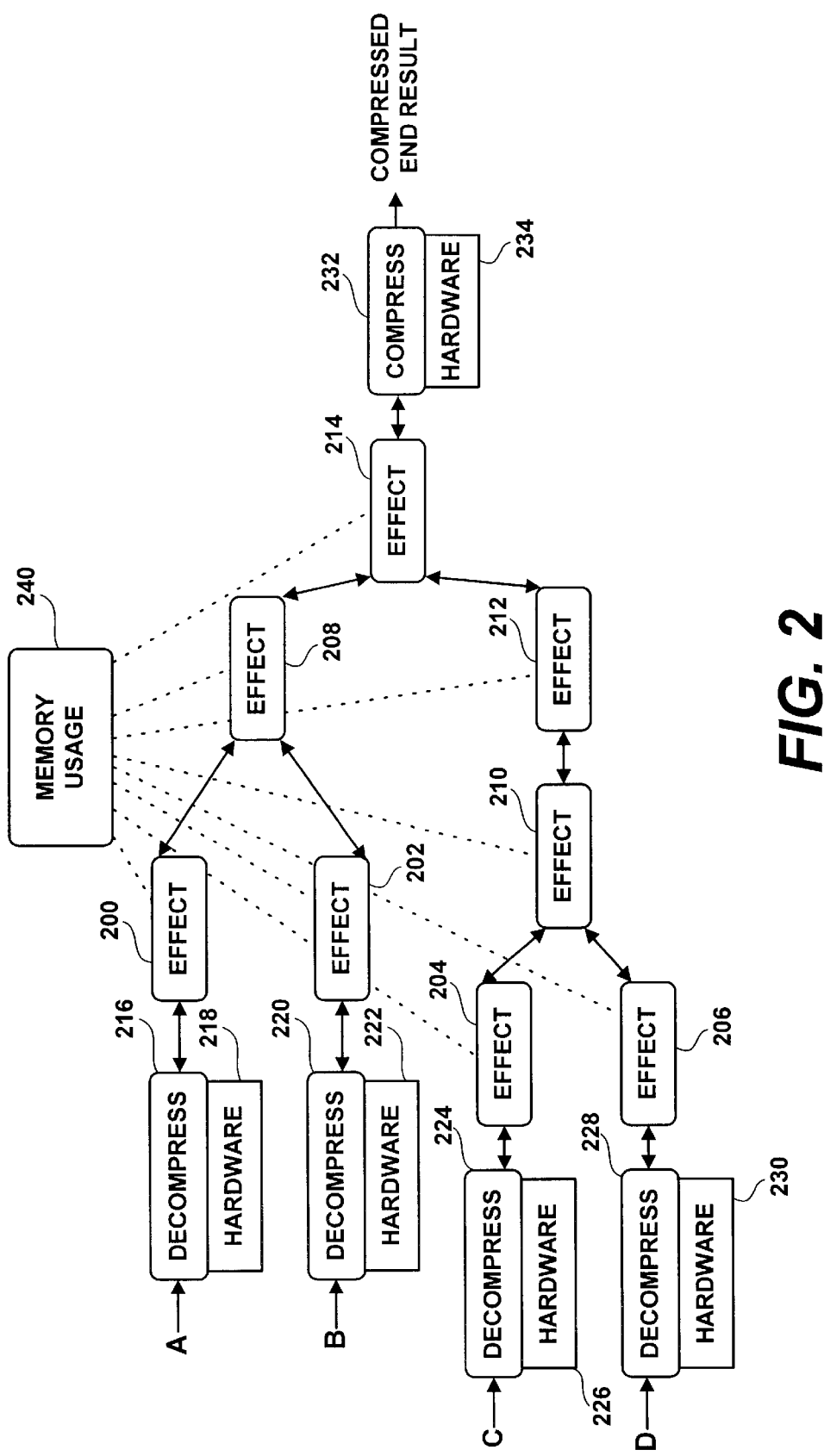
FIG. 2 is a schematic illustration of a graph representing the composition of FIG. 1.

An example of such a graph will now be described in connection with FIG. 2. FIG. 2 illustrates a graph that is representative of the portion of the composition shown in FIG. 1. In particular, the composition is defined by color corrections associated with effects 200, 202, 204 and 206, the outputs of which are combined by transition effects 208 and 210. Transition effect 210 provides its output to a color effect 212. Finally, effects 208 and 212 provide their outputs to the composite effect 214. The media stream A is provided to effect 200 by a decompression object 216, which is related to associated hardware 218. Similarly, effect 202 receives scene B through decompression object 220, which is associated with hardware 222. Effect 204 receives scene C from decompression object 224, which is associated with hardware 226. Finally, effect 206 receives scene D from decompression object 228, which is associated with hardware 230. A compression object 232 receives the resulting composition and processes it through hardware 234 to provide a compressed end result. The decompression objects 216, 220, 224 and 228, and compression object 232, are associated with hardware. In contrast, effects 200, 202, 204, 206, 208, 210, 212 and 214 are associated with software executed by the main processor using the system memory.

To facilitate allocating system memory, in a manner described below, a memory usage object 240 is related to and shared by the operations. The hardware associated with the operations and the memory usage object is the general-purpose computer, such as described now in connection with FIG. 3.

The general-purpose computer generally has a central processor 300 which is connected through an interconnection mechanism 302 to a system memory 304, a source of data 306 and other input/output devices 308. More particularly, the computer system of FIG. 3, typically includes at least one main unit connected to both one or more output devices which store information, transmit information or display information to one or more users or machines and one or more input devices which receives input from one or more users or machines. The main unit may include one or more processors connected to a memory system via one or more interconnection mechanisms. Any input device and output device also is connected to the processor and memory system via the interconnection mechanism. The general-purpose computer system is programmable using a computer programming language. Computer programming languages suitable for implementing such a system include procedural programming languages, object-oriented programming languages, combinations of the two, or other languages.

In a general purpose computer system, the processor is typically a commercially available processor which executes a program called an operating system which controls the execution of other computer programs and provides scheduling, debugging, input/output control, accounting, compilation, storage assignment, data management and memory management, and communication control and related services. The processor and operating system define a computer platform for which application programs in other computer programming languages are written. The invention is not limited to any particular processor, operating system or programming language.

A memory system typically includes a computer readable and writeable nonvolatile recording medium in which signals are stored that define a program to be executed by the processor or information stored on the disk to be processed by the program. Typically, in operation, the processor causes data to be read from the nonvolatile recording medium into another memory that allows for faster access to the information by the processor than does the disk. This memory is typically a volatile, random access memory such as a dynamic random access memory (DRAM) or static memory (SRAM). The processor generally manipulates the data within the integrated circuit memory and may copy the data to the disk after processing is completed. A variety of mechanisms are known for managing data movement between the disk and the integrated circuit memory element, and the invention is not limited thereto. The invention is not limited to a particular memory system.

Multiframe rendering as described herein may be implemented on such a system as a computer program product including a computer-readable medium on which instructions are stored for access and execution by a processor. Various steps may be performed by a computer processor executing instructions stored on a computer-readable medium to perform functions by operating on input and generating output.

Additionally, the computer system may be a multiprocessor computer system or may include multiple computers connected over a computer network. Various possible configurations of computers in a network permit access by multiple users to multiple instances of programs even if they are dispersed geographically. Each program or step shown in the figures and the substeps or subparts shown in the figures may correspond to separate modules of a computer program, or may be separate computer programs. Such modules may be operable on one or more separate computers or other devices. The data produced by these components may be stored in a memory system or transmitted between computer systems or devices.

Figure 3:
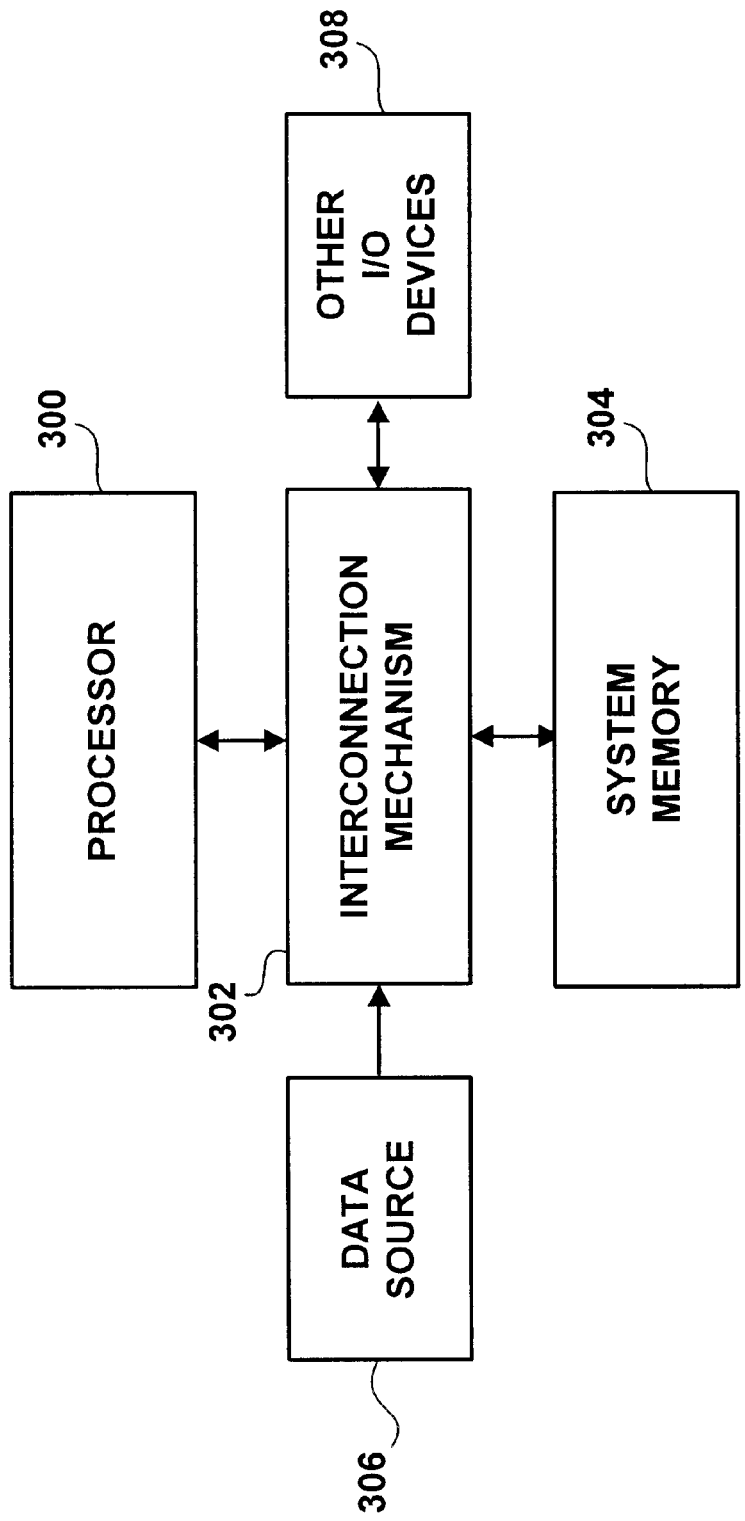
FIG. 3 is a block diagram of a general-purpose computer system for processing video data.

Using the general-purpose platform as described in connection with FIG. 3, a variety of compositions with a variety of combinations of effects and other video processing operations may be created using operations implemented in software that generate processed video data using the general-purpose processor and system memory. To manage the complexity of sharing these resources among the variety of operations, conventionally each operation is allocated a buffer of memory adequate to handle one sample of the video data, i.e., one image, that is either a field or a frame. For each image, requests for data are made by the operation, in response to which it receives the one sample of video data. Such requests involve latencies, particularly if the image is received from a compression/decompression circuit, or if the data is received over a network connection. If each image is processed separately, these latencies are compounded over every image.

To reduce compounding of latencies from multiple requests, multiple samples of data are requested from those operations or resources which introduce the latencies, and each operation is allocated sufficient memory to enable it to access more than one sample of video data. The memory is allocated to maximize the number of samples of data that may be requested at a time. Therefore, memory for the operations is allocated by sharing information among the operations used in the composition or portion of a composition being rendered. Also, the operations communicate regarding the maximum number of samples of video data that may be provided in response to any particular request for data. How memory is allocated and now the number of samples that may be processed by each operation is determined will now be described in connection with FIGS. 4–10.

FIG. 4 illustrates data used by operations to support the allocation of memory and management of response to requests for data. Each operation 400 stores an indication of a number 401 of buffers which it uses, the size 402 of the samples which it processes, and a number 403 of samples which the operation may provide upon request. The number 401 of buffers, size 402 of samples and number of samples 403 together represent the total amount of data used by the operation. This total amount of data is determined jointly for operations that share the available system memory. To support implementations where different operations may be receiving and/or outputting different format image data other combinations of data may be used to represent such information. Each operation also has a pointer 405 to a memory management data structure 410 which is shared by the operations. The memory management data structure 410 indicates a maximum number 412 of buffers and a current total number 414 of buffers. The uses of the values stored by the operations in the memory management data structure are described in more detail below.

Rendering effects or performing other operations in a composition using software involves allocating memory to be used by the operations. Memory typically is allocated for the operation when the operation is performed. Memory also may be allocated at the time of creating the graph of the composition, such as shown in FIG. 2, or may be allocated as a post process after the graph is created. A process of determining factors used to allocate memory is a depth first search of the graph of the composition. A depth-first search commonly uses what is called a "prefunction," when a node is first discovered in the graph, and a "postfunction," when processing of the node is finished. An example depth first search algorithm is described in *Introduction to Algorithms* by Thomas H. Cormen, Charles E. Leiserson and Ronald L. Rivest, MIT Press 1990, pages 477–485. When a node is identified in the search, as indicated at 500, its number of buffers (401) is added 502 to the current total (414) in the management memory data structure. If the current total is greater than the maximum number 412 of buffers, as determined in 504, the maximum number of buffers is set 506 to the current total. Otherwise, or after the maximum number of buffers is updated, the preprocess is done as indicated at 508.

Figure 6:
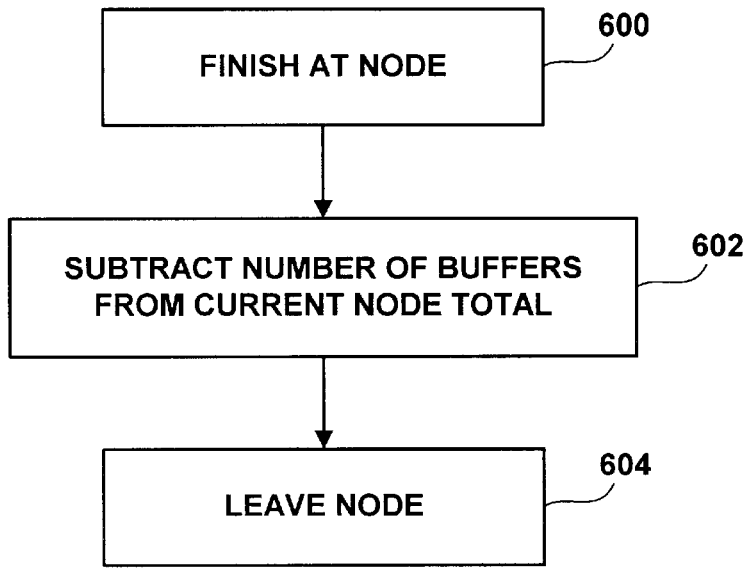
FIG. 6 is a flowchart describing another part of a process for determining factors for allocating memory.
Figure 7:
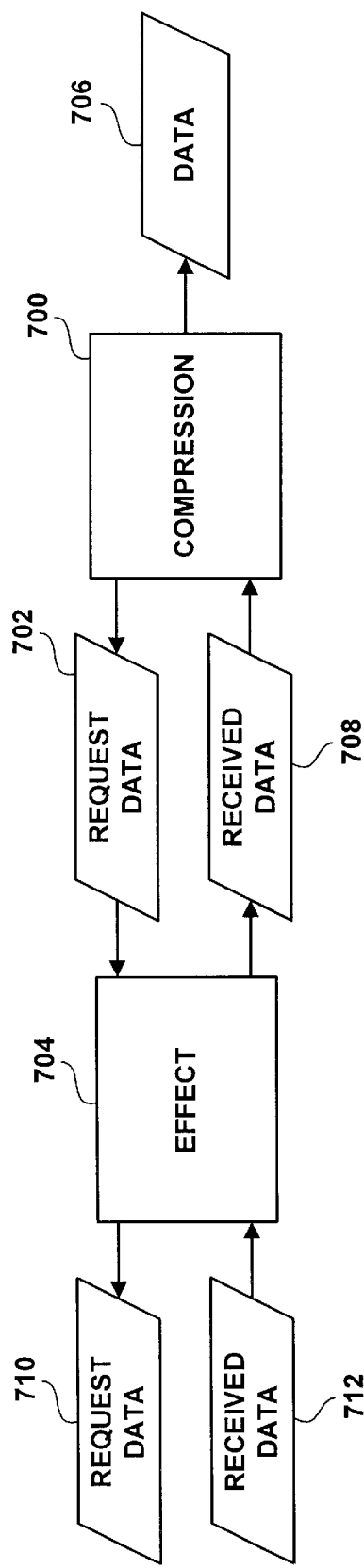
FIG. 7 is a data flow diagram illustrating how data is requested from an effect processor.

Referring to FIG. 6, when the depth first search finishes at a node, as indicated at 600, the number of buffers of the node (401 in FIG. 4) is subtracted from the current total (414 in the management memory data structure) as indicated at 602. Processing of that node is then terminated, as indicated at 604.

Figure 5:
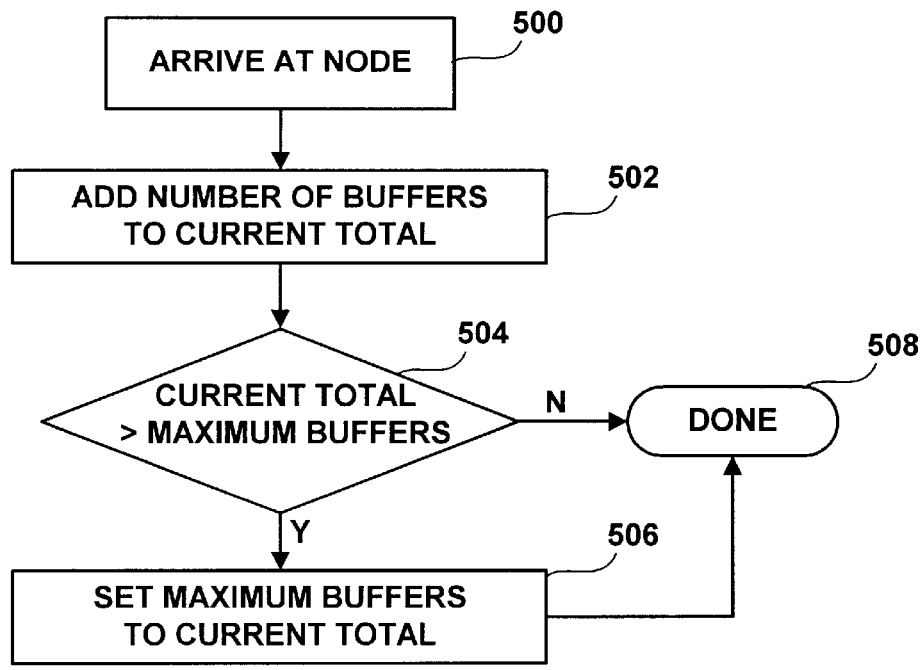
FIG. 5 is a flowchart of describing a part of a process for determining factors for allocating memory.

After a depth first search of the graph of the composition using prefunction FIG. 5 and postfunction FIG. 6, the memory management data structure stores a maximum number of memory buffers used in any branch of a tree that represents the combination of one or more effects or other operations for the composition. Referring to FIG. 2 as an example, assume that effect 200 uses two buffers, effect 202 uses two buffers, effect 204 uses two buffers, effect 206 uses two buffers, effect 210 uses three buffers, effect 208 uses three buffers, effect 212 uses two buffers and effect 214 uses three buffers. Using the process described in FIGS. 5 and 6, both the current total and the maximum number of buffers of the memory management data structure initially are set to zero. Upon visiting effect 214, both values are updated to three. After visiting effect 208, both values are set to six. Next, effect 200 is processed and both values are eight. After leaving effect 200 and returning to effect 208, the maximum number of buffers is eight, whereas the current total is six. After arriving at effect 202, the current total is updated to eight and the maximum number of buffers remains the same. Moving to effect 208 and then to effect 214, the maximum number of buffers is eight, whereas the current total is three. Upon visiting effect 212, the current total is updated to five. Next, effect 210 is visited and the current total is updated to eight. Effect 204 is then visited, and the current total and maximum number of buffers are both updated to ten. Effect 204 is then finished, and, after returning to effect 210, the current total is back to eight. Effect 206 is visited and the current total is updated to ten, but there is no change in the maximum number of buffers. The traversal of the tree is then finished by leaving effects 206, 210, 212 and 214 which returns the current total to zero, but the maximum number of buffers remains ten.

After determining the maximum number of buffers that are used by each operation, the hardware capabilities of the system are then determined. In particular, an operation compares the available memory to the number of buffers used by the operation to determine a number of samples that may fit in each of the buffers. This number of samples then may be used by the operation to allocate memory. These processes of determining the number of samples for each operation will now be described in connection with FIGS. 7–10.

In one embodiment, operations exchange data using a request/reply architecture. A request may be for more than one sample of video data. Each operation replies to a request with an amount of video data to the requestor. An example of such a request/reply architecture is used and described, for example, in U.S. Pat. No. 5,584,006, and is described in connection with FIG. 7. As an example, a compression processor 700 may issue requests for data 702 from upstream processing, such as effect processor 704. The compression processor typically makes such a request after it has output some data 706 and now has free buffer space in its input buffers. The upstream effect processor 704 provides received data 708 to the compression processor 700 after the effect processor has valid data available. Similarly, effect processor 704 makes requests 710 for data and receives data 712. To use this architecture, an operation determines how much data it can provide in reply to any given request. A process of determining this amount of data will now be described in connection with FIGS. 8–10.

An operation outputs data if it receives 800 a request. Each operation maintains a number of samples indicating an amount of data with which it may reply to a requestor as indicated at 403 in FIG. 4. If this number of samples has been set, as determined in step 802, the requested amount of data is compared to the number of samples in 804. If the requested amount of data is less than this number of samples, the requested number of samples may be returned in 806. Otherwise, the maximum number of samples is returned in 808. The number of samples might not be set (as determined in 802) if the operation is receiving a request for data for the first time and if memory has not yet been allocated for the operation. At this time, a number of samples that the operation may provide is determined and is set. After the number of samples is set for an operation, thus indicating a maximum amount of data that can be processed by the operation while sharing the memory with other operations, the operation may allocate memory. Memory may be allocated for an operation when the operation is used using the number of samples that has been set for the operation.

The process of determining the number of samples an operation may provide also may use a depth first search of the tree that represents the combination of one or more effects or other operations. The preprocess, described below in connection with FIG. 9, involves determining (810) the number of samples that this operation may process. A depth first search on the inputs of the operation is then performed in step 812. The postprocess for the depth first search is described in connection with FIG. 10 and involves verifying 814 the number of samples from input operations. In particular, the maximum number of samples an operation can provide is limited by the capability of the operations at its inputs. The number of samples which the operation may return is then returned in step 816.

Figure 9:
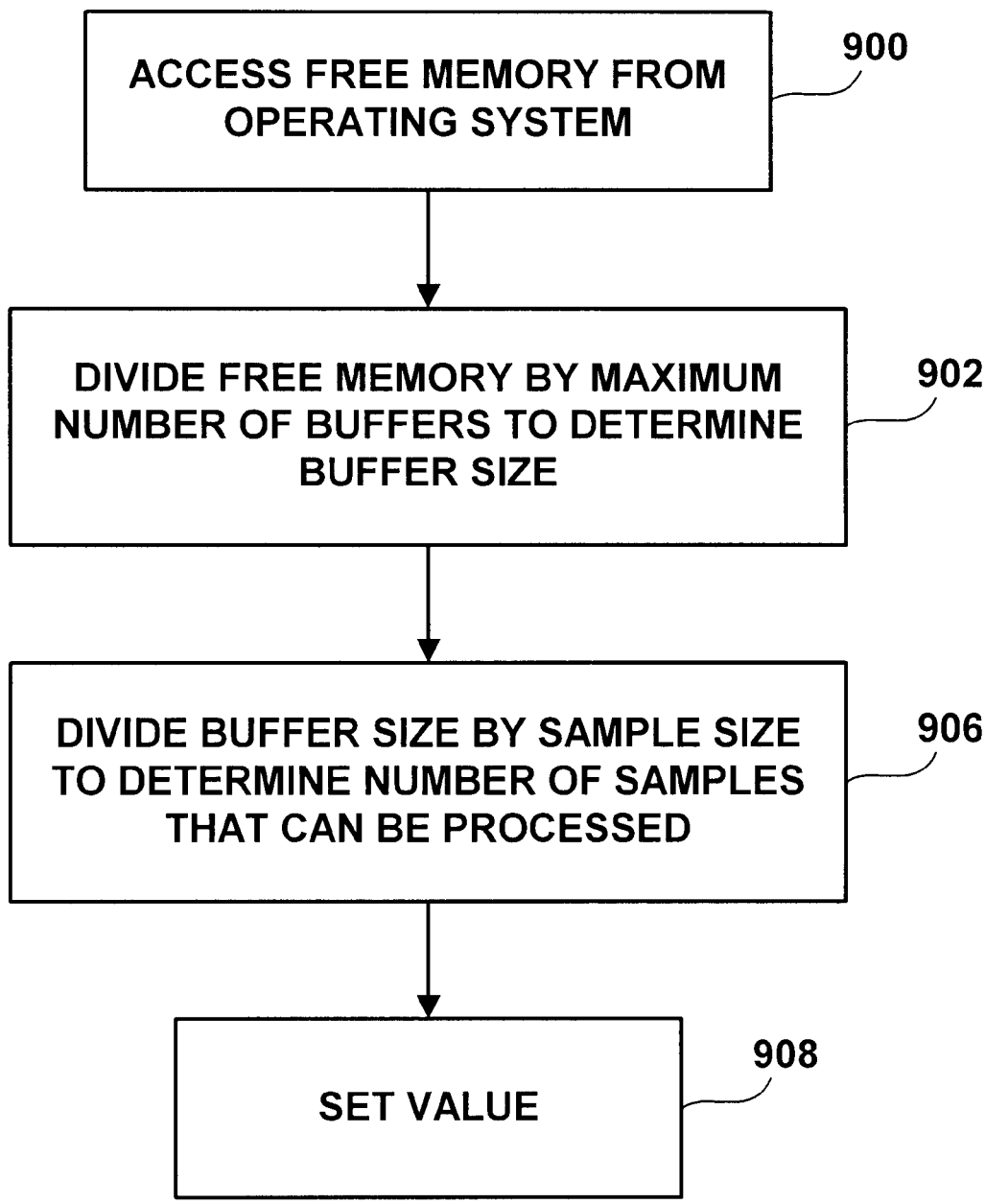
FIG. 9 is a flowchart illustrating part of how an operation determines a number of samples with which it may reply a request.

Referring to FIG. 9, how a number of samples that each operation can process is determined will now be described. First, the available free memory is accessed from the operating system in 900. Each operation divides this free memory value by its maximum number of buffers in 902. The determined buffer size then is divided by the sample size to determine the total maximum number of samples that can be processed by the operation in step 906. This value is set 908 in the operation data structures of FIG. 4.

Figure 10:
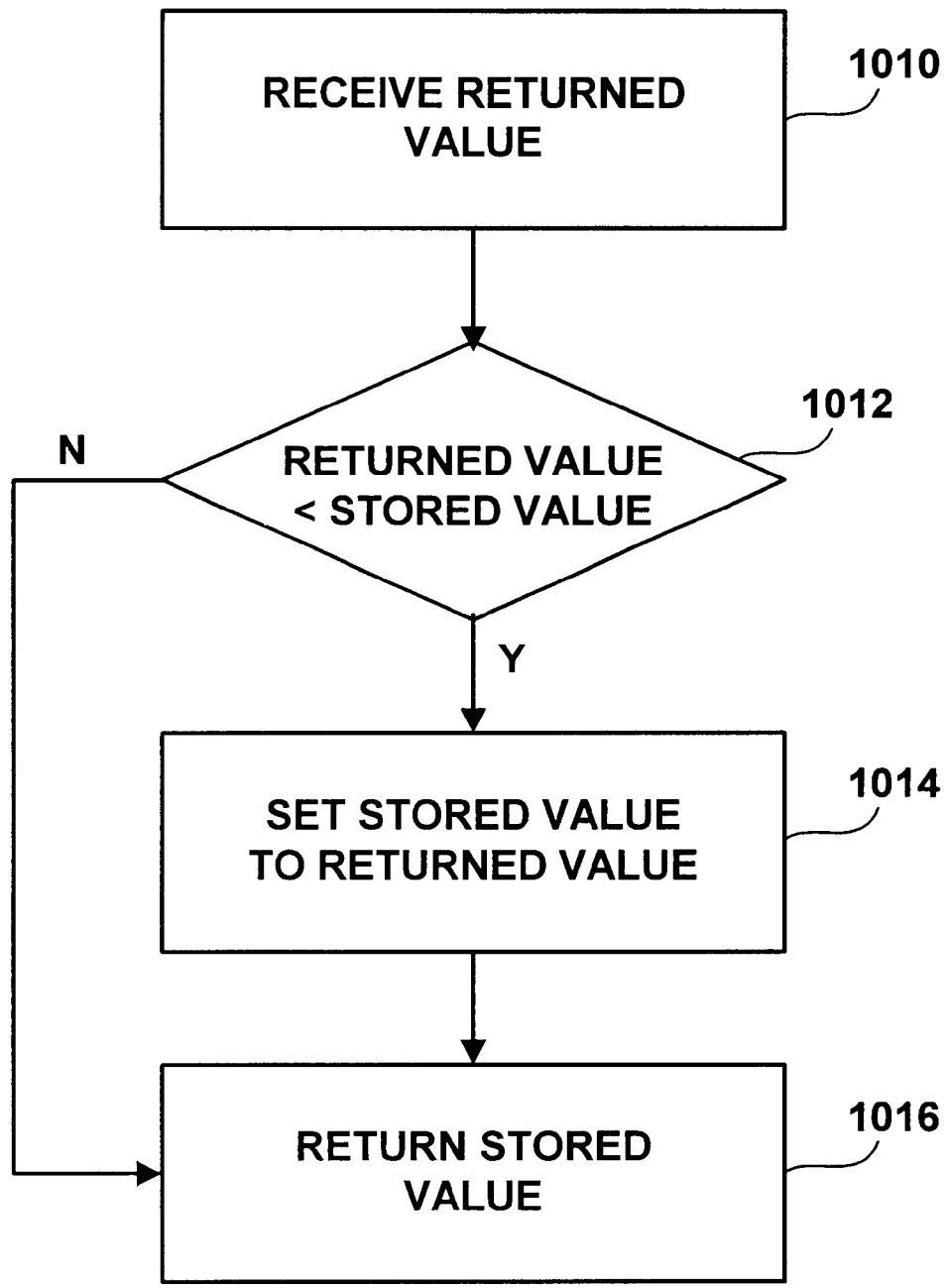
FIG. 10 is a flowchart illustrating another part of how an operation determines a number of samples with which it may reply to a request.

As noted above, after setting its own value for the number of samples, each operation determines the capability of operations that provide its inputs. In particular, an operation determines a minimum number of samples from among the maximum numbers of samples that may be provided to it from other operations in response to a request for data. Referring to FIG. 10, any returned value received 1010 from its inputs is compared 1012 to the stored value. If the returned value is less than the stored value, the stored value is set 1014 to the returned value. After the stored value has been verified or modified, it is returned 1016. Optionally, the operation at the root of the graph of the composition may pass its number of samples to each of the other operations in the graph of the composition. These other operations may set their respective numbers of samples to the value set by the operation at the root of the graph. After completing the setup operations of FIGS. 8–10, in response to the returned number of samples, the component at the root of the graph of the composition may request actual data from its input components.

Figure 8:
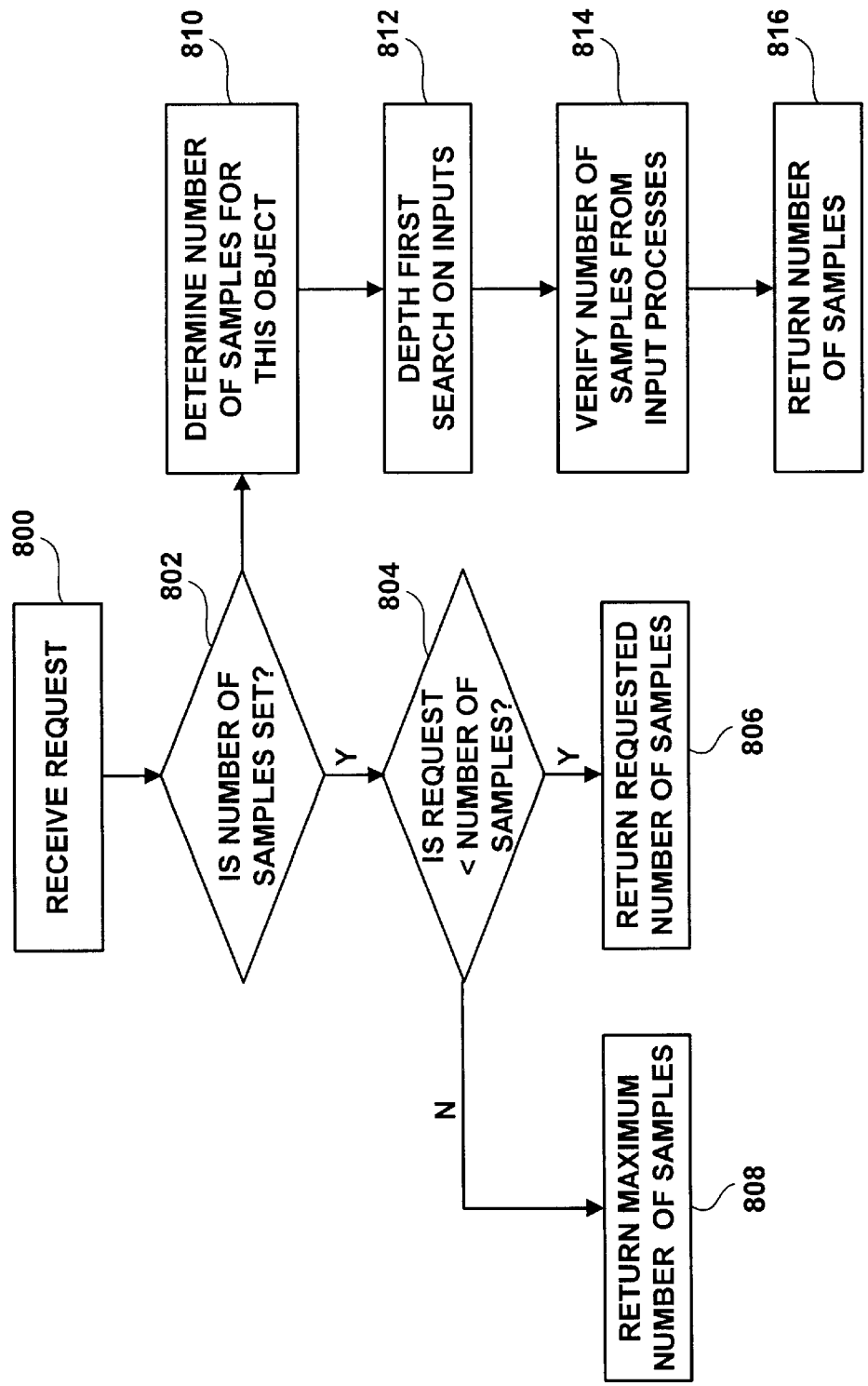
FIG. 8 is a flowchart describing how an operation determines an amount of data with which it may reply to a request.

After the traversal in FIGS. 8–10 of the tree that represents the composition, each operation has a number of samples that it may process, and from which it may determine an amount of memory to allocate from the available system memory. In particular, the number of buffers, the size of the each sample and the number of samples together indicate a maximum amount of data that can be processed by the operation while sharing the available memory with the other operations. It should be understood that the various steps and data used in FIGS. 4–10 may vary depending on implementation to arrive at a measure of the amount of memory to allocate for each operation. Each operation also knows the number of samples which it may reliably provide to any downstream requester.

With the foregoing system, latency may be reduced by allocating memory among multiple operations and determining a maximum amount of data that may be processed by an operation while sharing the available memory with other operations to enable pipelining of data through the combination of operations. Reducing latency also increases the number of frames of video that may be viewed in real time while the operations are being performed.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A method for allocating memory for processing video data, comprising:

determining an amount of available memory;

determining, for each operation in a combination of at least two operations, a maximum number of samples of the video data that can be processed by the operation while the available memory is apportioned among the at least two operations, wherein determining the maximum number of samples comprises:

determining a maximum number of buffers used by operations in any branch of a tree that represents the combination of the at least two operations;

dividing the amount of available memory by the maximum number of buffers to determine a maximum buffer size; and dividing the maximum buffer size by a size of each sample of the video data to provide a number of samples each operation can process using the available memory; and allocating the available memory according to the determined maximum number of samples of the video data that can be processed by each operation while the available memory is apportioned among the at least two operations.

2. The method of claim 1, wherein determining the number of samples further comprises:

determining a minimum from among maximum amounts of data that can be provided by any of the at least two operations; and limiting the determined number of samples by the determined minimum.

3. A computer program product comprising:

a computer readable medium;

computer program instructions stored on the computer readable medium that when executed by the computer instruct the computer to perform a process for allocating memory for processing video data, comprising:

determining an amount of available memory;

determining, for each operation in a combination of at least two operations, a maximum number of samples of the video data that can be processed by the operation while the available memory is apportioned among the at least two operations, wherein determining the maximum number of samples comprises:

determining a maximum number of buffers used by operations in any branch of a tree that represents the combination of the at least two operations;

dividing the amount of available memory by the maximum number of buffers to determine a maximum buffer size; and dividing the maximum buffer size by a size of each sample of the video data to provide a number of samples each operation can process using the available memory; and allocating the available memory according to the determined maximum number of samples of the video data that can be processed by each operation while the available memory is apportioned among the at least two operations.

4. The computer program product of claim 3, wherein determining the number of samples further comprises:

determining a minimum from among maximum amounts of data that can be provided by any of the one at least two operations; and limiting the determined number of samples by the determined minimum.

5. A method for reducing latency in processing video data using a combination of at least two operations on a general purpose computer, comprising:

determining an amount of memory available to the at least two operations;

determining, for each operation in the combination of at least two operations, a maximum number of samples of the video data that can be processed by the operation while the available memory is apportioned among the at least two operations, wherein determining the maximum number of samples comprises:

determining a maximum number of buffers used by operations in any branch of a tree that represents the combination of the at least two operations;

dividing the amount of available memory by the maximum number of buffers to determine a maximum buffer size; and dividing the maximum buffer size by a size of each sample of the video data to provide a number of samples each operation can process using the available memory;

allocating the available memory according to the determined maximum number of samples of the video data that can be processed by each operation while the available memory is apportioned among the at least two operations; and processing the video data using the combination of the at least two operations, wherein each operation requests data from other operations, and wherein the other operations respond to such requests with a number of samples of data corresponding to the memory allocated for the operation.

6. The method of claim 5, wherein determining the number of samples further comprises:

determining a minimum from among maximum amounts of data that can be provided by any of the at least two operations; and limiting the determined number of samples by the determined minimum.

7. A computer program product, comprising:

a computer readable medium;

computer program instructions stored on the computer readable medium that when executed by the computer instruct the computer to perform a process for reducing latency in processing video data using a combination of at least two operations on a general purpose computer, comprising:

determining an amount of memory available to the at least two operations;

determining, for each operation in the combination of at least two operations, a maximum number of samples of the video data that can be processed by the operation while the available memory is apportioned among the at least two operations, wherein determining the maximum number of samples comprises:

determining a maximum number of buffers used by operations in any branch of a tree that represents the combination of the at least two operations;

dividing the amount of available memory by the maximum number of buffers to determine a maximum buffer size; and dividing the maximum buffer size by a size of each sample of the video data to provide a number of samples each operation can process using the available memory;

allocating the available memory according to the determined maximum number of samples of the video data that can be processed by each operation while the available memory is apportioned among the at least two operations; and processing the video data using the combination of the at least two operations, wherein each operation requests data from other operations, and wherein the other operations respond to such requests with a number of samples of data corresponding to the memory allocated for the operation.

8. The computer program product of claim 7, wherein determining the number of samples further comprises:

determining a minimum from among maximum amounts of data that can be provided by any of the at least two operations; and limiting the determined number of samples by the determined minimum.

9. A method for enabling a first operation to determine a number of samples of data to provide in response to a request for data from a second operation for processing video data, comprising:

receiving the request for data from the second operation;

if a number of samples of data to provide in response to the request has not been determined, then determining a minimum amount of data from among maximum amounts of data that may be provided to the first operation from at least one third operation in response to requests for data from the first operation; and if the number of samples of data to provide in response to the request has been determined, then responding to the second operation with the determined number of samples of data.

10. A computer program product, comprising:

a computer readable medium;

computer program instructions stored on the computer readable medium that, when executed by the computer, instruct the computer to perform a process for enabling a first operation to determine a number of samples of data to provide in response to a request for data from a second operation for processing video data, comprising:

receiving the request for data from the second operation;

if a number of samples of data to provide in response to the request has not been determined, then determining a minimum amount of data from among maximum amounts of data that may be provided to the first operation from at least one third operation in response to requests for data from the first operation; and if the number of samples of data to provide in response to the request has been determined, then responding to the second operation with the determined number of samples of data.

11. A method for processing video data according to a combination of operations, wherein each operation has an input and an output, and wherein the output of at least one of the operations provides samples of video data to the input of another of the operations, wherein a sample of video data comprises an image, comprising:

determining an amount of available memory for performing the combination of operations on the video data;

determining, for each operation in the combination of operations, a maximum number of samples of the video data that can be processed by the operation while the available memory is apportioned among the at least two operations to perform the combination of operations; and allocating a portion of the available memory to each of the operations according to the determined maximum number of samples of the video data that can be processed by each of the operations while the available memory is apportioned among the at least two operations.

* * * * *